US006940081B1

(12) United States Patent
Bär et al.

(10) Patent No.: US 6,940,081 B1
(45) Date of Patent: Sep. 6, 2005

(54) INFRARED IRRADIATION

(75) Inventors: Kai K. O. Bär, Bruckmühl (DE); Rainer Gaus, Bruckmühl (DE)

(73) Assignee: Advanced Photonics Technologies AG, Bruckmuhl-Heufeld (DE)

( * ) Notice: Subject to any disclaimer, the term of this patent is extended or adjusted under 35 U.S.C. 154(b) by 0 days.

(21) Appl. No.: 09/937,995

(22) PCT Filed: Mar. 29, 2000

(86) PCT No.: PCT/EP00/02773

§ 371 (c)(1), (2), (4) Date: Dec. 20, 2001

(87) PCT Pub. No.: WO00/60295

PCT Pub. Date: Oct. 12, 2000

(30) Foreign Application Priority Data

Apr. 1, 1999 (DE) ........................................ 199 15 059

(51) Int. Cl.[7] .............................. G01J 1/00; G01J 5/00
(52) U.S. Cl. .............................. 250/504 R; 250/495.1; 250/338.1
(58) Field of Search ................................ 392/419, 420; 250/504 R, 495.1, 338.1, 455.11, 454.11, 453.11, 422, 424, 365, 343, 497.1

(56) References Cited

U.S. PATENT DOCUMENTS

| | | | | |
|---|---|---|---|---|
| 5,050,232 A | | 9/1991 | Bergman et al. | |
| 5,517,768 A | | 5/1996 | Aviv | |
| 5,645,884 A | | 7/1997 | Harlow, Jr. et al. | |
| 5,737,500 A | * | 4/1998 | Seraji et al. | 700/251 |
| 5,740,314 A | * | 4/1998 | Grimm | 392/420 |
| 5,751,897 A | * | 5/1998 | Van Alstyne | 392/419 |
| 5,782,974 A | * | 7/1998 | Sorensen et al. | 117/82 |
| 6,001,204 A | * | 12/1999 | Halg et al. | 156/108 |

FOREIGN PATENT DOCUMENTS

| | | |
|---|---|---|
| DE | 2850421 A | 3/1980 |
| DE | 8910388 | 9/1989 |
| DE | 4330453 A | 3/1995 |
| FR | 2416059 A | 8/1979 |
| GB | 2306210 A | 4/1997 |

* cited by examiner

*Primary Examiner*—Frank G. Font
*Assistant Examiner*—Mary El-Shammaa
(74) *Attorney, Agent, or Firm*—Marshall, Gerstein & Borun LLP

(57) ABSTRACT

The invention relates to a method and a system for irradiating objects with infrared radiation, in particular in order to dry surface layers and/or fix them in place, wherein a radiation source (10) is moved by means of a robot (1) into one or several operating positions in which the particular target object is irradiated.

14 Claims, 1 Drawing Sheet

INFRARED IRRADIATION

BACKGROUND OF THE INVENTION

The invention relates to a method and a system for irradiating objects with infrared radiation, in particular for the purpose of drying surface layers and/or fixing them in position.

For example, a known procedure for the serial lacquering of the surfaces of objects is to transport the objects through a lacquering chamber. This chamber contains a mist of lacquer droplets, which precipitate onto the surfaces of the objects. Subsequently the objects are transported into a drying chamber where the layer of lacquer is dried.

Particularly in the case of objects with irregularly shaped, complicated surfaces it is further known to employ industrial robots that are freely programmable; these can spray nearly uniformly thick layers of lacquer onto the relevant surface regions. By means of the industrial robots it is possible to reach even relatively inaccessible parts of the surface, for instance in the region of recesses, cavities, joints and the like. The industrial robots can also be used to lacquer only specified parts of the surface.

In the manufacture of automobiles industrial robots are similarly employed to seal cavities, for instance in the wheel cases of a chassis. The pasty or liquid sealing material is disposed on the surface of the cavity by means, for example, of a spray gun carried by the robot.

Drying or fixation of the above-mentioned materials, after they have been applied by the industrial robots, is customarily achieved by passage through a continuous furnace. The time taken for the objects to pass through the furnace is predetermined such that the desired drying or fixation of the applied materials is accomplished. These passage times typically amount to several minutes.

Another known method of drying or fixation is by passing the materials through chambers in which large-area infrared radiators are disposed, for example on the walls of the chamber. These infrared radiators are typically operated at surface temperatures below 1000 K.

In both the continuous furnaces and the radiation chambers, large areas of the surfaces of objects, or even the object as a whole, are unavoidably heated. Material disposed at places on the surface that are hidden and/or difficult to reach, therefore, as a rule can be dried or fixed only by heating the object at least in the region including these places. That is, drying or fixation occurs by thermal conduction. The heat thus transported must previously have entered the body of the object by way of its surface. Furthermore, it is impossible to begin to dry or fix the applied materials while the process of application is still underway at other places on the surface of the object.

One objective of the present invention is to disclose a method and a system for irradiating objects with infrared radiation that enable a rapidly acting irradiation even of sites that are hard to reach, as well as a spatially restricted irradiation of specified regions of the surface of the object to be irradiated. Another objective is to disclose a means of applying infrared radiation to target objects that is suitable for the method and/or system.

SUMMARY OF THE INVENTION

These objectives are achieved by a method with the characteristics given in claim 1, by a system with the characteristics given in claim 9, and by an application with the characteristics given in claim 3. Further developments are the subject matter of the subordinate claims in each case.

In accordance with a central idea of the invention, a source of infrared radiation is moved by means of a robot into one or several operating positions, in which radiation is applied to the particular target object. The term "robot" designates industrial robots and similar movable apparatus capable of placing the radiation source in the desired operating position or positions. It is advantageous for the robot to be freely programmable, so that within its operating range it can move to any desired position and, preferably, in each of these positions can aim the radiation source in any desired, freely predeterminable direction.

As radiation source a halogen lamp is preferred, which in particular can comprise an annular tube that is transparent to radiation and an incandescent filament that extends through the interior of the tube. Alternatively or additionally, the halogen lamp can comprise at least one straight radiation-transparent tube, with an incandescent filament extending linearly therein.

Preferably the radiation source is combined with a reflector to reflect infrared radiation from the source towards one or several target objects, and the reflector is so disposed that the robot can move it together with the radiation source. In a special embodiment the reflector can be moved independently of any movement of the radiation source, in particular can be folded upward, so that in a given operating position it can be oriented so as to concentrate the radiation onto the target object or objects. This orientation movement, independent of the movement of the source, can already begin or be completed while the robot is in the process of moving the radiation source. By this means the combination of radiation source and reflector can be brought into relatively inaccessible operating positions, such as into cavities.

The robot advantageously comprises a holder to contain the radiation source, in which case the holder is connected by way of a pivotable and/or linearly movable robotronic mechanism to a supporting device that keeps the robot stably at the desired site. In a manner known per se, the robotronic mechanism can in particular be swiveled about several axes, for example six axes. In this way, by combination with a suitable robot controller, the freely predeterminable and arbitrary position and orientation of the radiation source can be approached and established.

In a further development of the method in accordance with the invention, the radiation source is moved continuously within a range of operating positions, so that the infrared radiation sweeps across one or more surface regions of the target object. The radiation source thus "scans", so to speak, the surface of the object. By this means even surfaces with the most complicated geometries can be irradiated with a uniform input of energy per unit area. It is also possible, for instance when a coating is being applied to a chassis, to begin the irradiation in one surface region, or in the region of joints, cavities or similar recessed spaces, while at another site material is still being applied. In particular, because of this feature it is no longer necessary to treat the entire surface, i.e. the entire target object or at least large parts thereof, when irradiation or treatment is actually required only in smaller areas of the surface. Hence by means of the invention production times can be shortened and in some circumstances continuous furnaces, irradiation chambers and similar space-consuming equipment can be eliminated.

The invention also makes it possible to treat surface regions that are extremely difficult to access. For example, when low-viscosity materials are applied in recesses or in cavities of the object, the applied material must be rapidly dried or consolidated. There is no time available for the object to be transported to a distant continuous furnace or into an irradiation chamber. Therefore, according to a preferred further development of the method in accordance with the invention, it is proposed to select at least one operating position such that the infrared radiation can be directed into a recess or a cavity of the target object.

Irradiation with infrared radiation in the sense of the invention can be employed for a great variety of applications. In addition to the drying and/or fixation of surface coatings as mentioned above, examples include the hardening of materials used to fill joints or similar crevices, quality control by means of infrared irradiation, and the heating of an object by irradiation in preparation for subsequent procedures such as the attachment of materials or objects to its surface. Furthermore, the invention is in priciple also applicable for the irradiation of objects with electromagnetic radiation in other wavelength regions, for instance in the ultraviolet or the visible region.

The invention can be employed to particular advantage when the irradiation of a target object is preceded by the beginning of application of a material that is to be disposed on the surface and/or in joints, cavities or similar recesses in the target objects and is to be dried or fixed by irradiation. Then the application of the material can advantageously also be done by means of a robot, which moves the applying device into one or several operating positions. In a further development, the sequence of movements of the robot used for application and that of the robot used for irradiation are the same, at least in part, and/or the movement paths of the two robots are at least partially congruent. The robot used for applying the material can either be the same one as is used for irradiation of the object, or another robot. In either case, this embodiment offers the advantage that the robot or robots can be controlled in the same or a similar manner for both procedures. For example, a computer program can be used to control the robot or robots in the same or a similar way.

It is especially preferred to use infrared radiation in the near infrared, i.e. in the wavelength region between the visible and 1.5 micrometers wavelength. Accordingly, in particular a radiation source is used that has a thermal radiator designed for the emission of electromagnetic radiation at surface temperatures of more than 2000 K, in particular more than 2500 K. Operation at such high surface temperatures offers the advantage that, according to Plank's radiation law, the radiance of the emitted radiation increases about as the fourth power of the absolute surface temperature (provided that the emissivity is approximately independent of temperature). At the high temperatures proposed here, therefore, the amount of energy required for the particular purpose of the irradiation can be transferred to the irradiated object in a short time. Hence it is especially preferred to use radiation sources with thermal radiators that can be operated at surface temperatures of more than 3000 K. In this case the energetic maximum of the emitted radiation is at wavelengths below 1 micrometer. A further advantage of the short irradiation times attainable with appropriately high radiation flux densities lies in the slight degree to which the irradiated object as a whole is heated. That is, the surfaces of the object or the layers disposed on the surface can be heated thoroughly in a short time, which is insufficient for heat to be conducted through the whole body of the object. By adjusting the spectrum of the incident radiation in accordance with the absorption properties of the surface of the target object, or the layers covering that surface, it is even possible to limit the heating to a specified depth. For example, if the absorptance of a surface layer is distinctly lower than 1, but nevertheless because of the thickness of the surface layer almost all the radiant energy is absorbed in the surface layer, then although the surface layer is thoroughly heated, there is no appreciable heating of the underlying layer or layers.

BRIEF DESCRIPTION OF THE DRAWINGS

With reference to the attached drawing, exemplary embodiments of the present invention will now be explained in detail. However, the invention is not restricted to these exemplary embodiments. The individual figures in the drawing are as follows.

DETAILED DESCRIPTION

Figure 1:
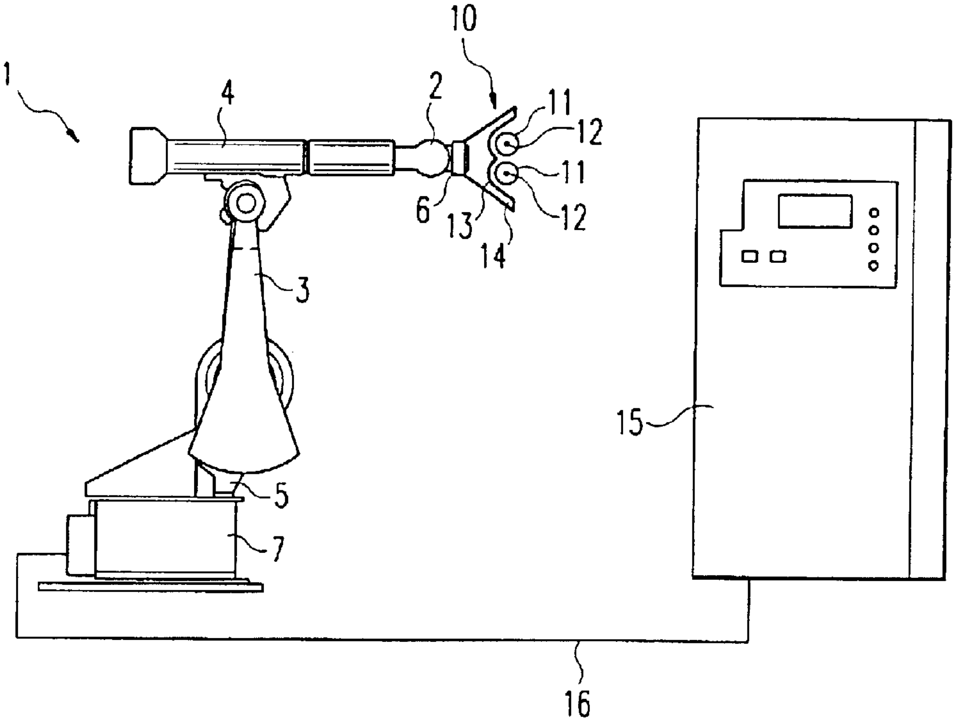
FIG. 1 shows a system for the irradiation of objects with infrared radiation.

The schematic drawing in FIG. 1 shows a robot 1 that carries a halogen radiator 10. Here the robot 1 and the halogen radiator 10 are in the standby position. The robot 1 can move out of this position so as to put the radiator 10 into various operating positions and orient the radiator 10 in such a way that pre-programmed surface regions of a target object (not shown) can be irradiated with a specified radiation flux density and for a specified period of time. The sequence of movements of the robot 1 required for this purpose is controlled by a control unit 15, as is the time during which an electric current is turned on in order to produce the desired amount of infrared radiation. The control unit 15 is connected, by way of a cable comprising control leads 16, to a stand 7 on which the robot 1 is mounted. From there each of the individual control leads runs to its particular connector.

Figure 2:
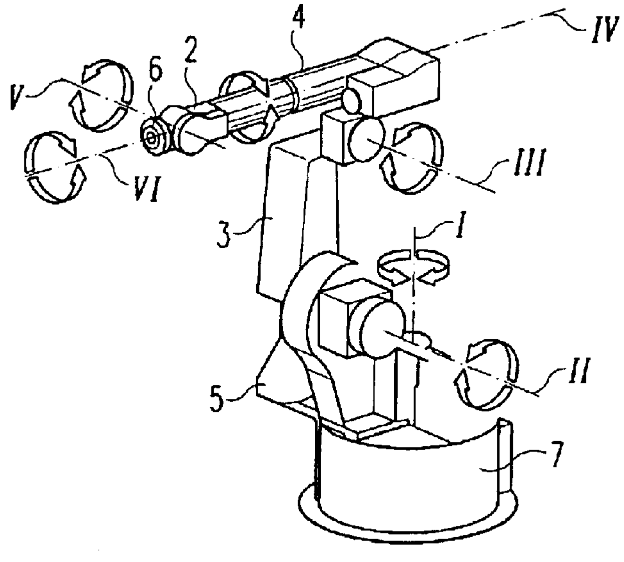
FIG. 2 shows the axes of rotation of a six-axis robot similar to that shown in FIG. 1.

The robot 1 comprises six axes of rotation, as shown in FIG. 2. Axis 1 is vertically oriented; about this axis a carousel 5 of the robot 1 can be swivelled with respect to the stand 7. With respect to the carousel 5, in turn, a rocker 3 of the robot 1 can be swiveled about the horizontally oriented axis II. At the upper end of the rocker 3 is the axis III, about which an arm 4 of the robot 1 can be swiveled with respect to the rocker 3. The axis III runs parallel to the axis II. At the front end of the arm 4 is the device holder 6. However, the arm 4 is not in itself immovable but rather offers three more opportunities for rotational movements. First, the whole front part of the arm 4 can be rotated about the long axis of the arm 4 (i.e., about the axis IV) with respect to the back part, which is pivotably connected to the rocker 3. In the front part of the arm 4 is a central hand 2 that can be swiveled about the axis V, which is oriented transverse to the long axis of the arm 4. Finally, the device holder 6 can be rotated about the axis VI, which is oriented perpendicular to the axis V. When the robot is arranged as represented in FIG. 2, the axes IV and VI are identical. However, if the central hand 2 is rotated out of the position shown there, about the axis V, the position of the axes IV and VI relative to one another changes, in such a way that the latter two axes lie in a common, vertical plane.

As shown in FIG. 1, a halogen radiator 10 is attached to the device holder 6, so that the radiator 10 can be moved according to the various possible directions of rotation described above. The radiator 10 comprises two straight quartz-glass tubes 11 disposed parallel to one another, within each of which a halogen atmosphere is enclosed by an air-tight seal; each tube 11 contains a tungsten incandescent filament 12 that runs along the long axis of the tube. Because the filaments 12 are extremely thin and hence have only an extremely small thermal mass, when the electric current through the filaments 12 is turned on, the desired temperature, which corresponds to the magnitude of the electric current, is reached within a few fractions of a second. Then the surface temperature of the tungsten filaments 12 is preferably about 3100 K.

The two quartz-glass tubes 11 are supported at their ends by a holder (not shown) fixed to the carrier element 14. The carrier element 14 is hollowed out to conform to the shape and position of the two quartz-glass tubes 11; this configuration serves to provide a reflector 13 to reflect the infrared radiation that is emitted in the backward direction by the tungsten filaments 12. The carrier element 14 is shown in FIG. 1 as though cut open at its side. The reflective surface of the reflector 13 consists of polished aluminum and as represented in FIG. 1 is shaped approximately like a double parabola.

The system shown in FIG. 1 is used, for example, in the manufacture of automobile chassis to dry pasty or liquid materials that have been applied to the surface of the chassis in concealed places, such as in wheel cases or similar cavities. To shorten the production time, drying by means of the robot 1 and the halogen radiator 10 begins immediately after the liquid or pasty materials have been disposed here, while these materials are still being applied to other parts of the chassis. Application of the liquid or pasty materials is also carried out by means of a robot constructed in the same way as the robot 1. This robot, which is not shown here, moves a spray nozzle into the operating position, whereupon the liquid or pasty material is sprayed onto the chassis. The nozzle and the halogen radiator 10 are so designed and are so operated that the device holder 6 (or the device holder of the other robot) is at the same distance from the surface to be dried during spraying as during drying. Therefore the two robots can carry out the same sequence of movements in order to bring the spray nozzle or the halogen radiator 10 into the operating position. After the spraying in one region has been completed, the chassis needs merely to be transported a short distance further to put this region, which now needs to be dried, into a position that can be reached by the robot 1. With this system, the apparatus for controlling two robots is not substantially more elaborate than that needed to control one robot. In particular, the movement sequence programmed in the control unit 15 can be executed twice, approximately identically, in succession with some time delay.

List of Reference Numerals

1 Robot
2 Central hand
3 Rocker
4 Arm
5 Carousel
6 Device holder
7 Stand
10 Halogen radiator
11 Quartz-glass tube
12 Tungsten incandescent filament
13 Reflector
14 Carrier element
15 Control unit
16 Control leads
I–VI First to sixth axis of rotation

What is claimed is:

1. Method for irradiating objects with infrared radiation, in particular in order to dry surface layers and/or fix them in place, wherein a radiation source is moved by means of a robot into one or several operating positions in which the particular target object is irradiated, characterized in that the radiation is emitted by a thermal radiator with a surface temperature of more than 2500 K, and the infrared radiation has a spectral radiance maximum in the near infrared.

2. Method according to claim 1, wherein the radiation source is moved continuously within a range of operating positions in such a way that the infrared radiation sweeps over one or several regions on the surface of the target object.

3. Method according to claim 1, wherein at least one operating position is chosen such that the infrared radiation is directed into a recess or into a cavity in the target object.

4. Method according to claim 1, wherein irradiation of the target object is preceded by the beginning of application of a material that is disposed on the surface and/or in joints, cavities or similar recessed spaces in the target object and that is dried and/or fixed by the irradiation.

5. Method according to claim 4, wherein the application of the material is also performed by a robot, which moves an application device into one or several operating positions.

6. Method according to claim 5, wherein the sequence of movements of the robot used for application and that of the robot used for irradiation are the same, at least in part, and/or the two robots' movement paths are at least partially congruent.

7. Method according to claim 1, wherein a plurality of target objects are irradiated consecutively by the same radiation source, such that the same robot moves the radiation source and from the standpoint of the target objects the radiation source progresses through the same movement path in each case.

8. Application of a halogen lamp as a radiation source in carrying out the method according to claim 1, such that the halogen lamp together with a reflector is moved by a robot into one or several operating positions in which the particular target object is irradiated.

9. System for irradiating objects with infrared radiation, in particular in order to dry surface layers and/or fix them in place, comprising:

a radiation source operating in the near infrared to generate the infrared radiation including a thermal radiator with a surface temperature of more than 2500K, and a robot to move the radiation source into one or several operating positions, in which the target object is irradiated, wherein the radiation source is combined with a reflector to reflect infrared radiation from the radiation source in the direction of one or several target objects, and wherein the reflector can be moved together with the radiation source by the robot.

10. System according to claim 9, wherein the robot comprises a holder to contain the radiation source, such that the holder is connected, by way of a pivotable and/or linearly movable robotronic mechanism, to a supporting device to keep the robot stably supported in a fixed location.

11. System according to claim 10, wherein the robotronic mechanism can be swiveled about multiple axes of rotation.

12. System according to claim 9, wherein the reflector can be moved independently of a movement of the radiation source.

13. System according to claim 11, wherein the robotronic mechanism can be swiveled about six axes of rotation.

14. System according to claim 12, wherein the reflector can be folded upward, in such a way that in an operating position it can be directed so as to concentrate the irradiation onto the target object or objects.

* * * * *